UNITED STATES PATENT OFFICE.

MAX ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PROCESS OF MAKING ANTHRACENE DYE.

No. 855,248.    Specification of Letters Patent.    Patented May 28, 1907

Application filed February 12, 1907. Serial No. 357,060.

*To all whom it may concern:*

Be it known that I, MAX ISLER, chemist, a citizen of the Swiss Republic, residing at Mannheim, Germany, have invented new and useful Improvements in the Production of Anthracene Dye, of which the following is a specification.

I have discovered that 1-amidoanthraquinon can be easily converted into azin derivatives of the anthracene series by heating it with a condensing agent, such for instance as hydrochloric acid, sulfuric acid, phosphoric acid, sodium bisulfate, copper sulfate, copper chlorid, ferric sulfate, ferric chlorid, chromic sulfate, chromic chlorid, chrome alum, mercuric sulfate, vanadium tetrachlorid, aluminium sulfate, aluminium chlorid, mercuric chlorid, strontium nitrate, barium nitrate, copper phosphate, copper pyrophosphate, and the like. When making use of an acid it is not necessary to use it in the concentrated state since the reaction proceeds with dilute acids, for instance with from twenty, to thirty, per cent. hydrochloric acid, or with from twenty, to forty, per cent. sulfuric acid, and further some of the above mentioned salts may be used in the form of their solutions, for instance instead of using solid aluminium chlorid, a thirty-two per cent. solution thereof may be employed. The reaction is preferably carried out in a closed vessel, although, in some cases, an open vessel may be used, and, if desired, an oxidizing agent can be added to the reaction mixture.

The products of my invention appear to be identical with the blue coloring matters obtainable as described in the specification of Letters Patent Nos. 682,523 and 724,789.

The following examples will serve to illustrate further the nature of my invention and how it may be carried into practical effect, but the invention is not confined to these examples. The parts are by weight.

Example 1. Mix together ten (10) parts of 1-amidoanthraquinone and from five (5), to ten (10), parts of hydrochloric acid (containing from twenty (20), to thirty (30), per cent. HCl), and heat the mixture in an autoclave for twenty-four (24) hours at a temperature of from two hundred and twenty (220), to two hundred and fifty (250), degrees centigrade. When the reaction product is cold, dilute with water, filter, and, if desired, purify the product in a manner described in the specification of Letters Patent 724,789. The concentration of the hydrochloric acid can be considerably varied, the azin formation taking place even when a weaker acid is employed. The reaction can also be carried out by heating the hydrochloric acid salt of 1-amidoanthraquinone by itself in an autoclave to a temperature of from two hundred and twenty (220), to two hundred and fifty (250), degrees centigrade. Instead of hydrochloric acid, hydrobromic acid (containing for instance forty-eight (48) per cent. HBr), or hydroiodic acid (containing for instance forty (40) per cent. HI), can be employed.

Example 2. Mix together ten (10) parts of 1-amidoanthraquinone and from ten (10), to twenty (20), parts of sulfuric acid (containing from twenty (20), to forty (40), per cent. $H_2SO_4$), and heat the mixture in an autoclave for from twenty-four (24), to thirty (30), hours at a temperature of from two hundred (200), to two hundred and fifty (250), degrees centigrade and work up the product as described in the foregoing Example 1. The oxygen which is necessary for the reaction appears to be provided by the sulfuric acid, since, on opening the autoclave, a large quantity of sulfur dioxid escapes. If desired, the reaction can be carried out in the presence of an oxidizing agent, such for instance as copper sulfate, finely divided manganese dioxid, chromic acid, or ferric chlorid.

Example 3. Mix together ten (10) parts of 1-amidoanthraquinone, twenty (20) parts of thirty-five (35) per cent. sulfuric acid and from two (2), to three (3), parts of chromic acid, and heat the mixture for twelve (12) hours in an autoclave at a temperature of two hundred (200) degrees centigrade, and work up the reaction product as described in the foregoing Example 1.

Example 4. Mix together equal parts of 1-amidoanthraquinone and phosphoric acid (containing about eighty-seven (87) per cent. of $H_3PO_4$), and treat the mixture as described in the foregoing Example 3.

Example 5. Introduce, while stirring, ten (10) parts of 1-amidoanthraquinone into from thirty (30), to fifty (50), parts of molten sodium bisulfate at a temperature of two hundred (200) degrees centigrade, and then continue heating at a temperature of two hundred and fifty (250) degrees centigrade until no amidoanthraquinone remains unaltered. Work up the product as described in the foregoing Example 1. If desired, the reaction can be carried out under pressure, in which case, however, it is preferred to employ only from ten (10), to twenty (20), parts of sodium bisulfate. In this example, sodium pyrosulfate can be used instead of sodium bisulfate.

Example 6. Heat together in an autoclave for twelve hours (12) at a temperature of from two hundred and forty (240), to two hundred and fifty (250), degrees centigrade, ten (10) parts of 1-amidoanthraquinone and thirty (30) parts of chromic sulfate and work up the product as described in the foregoing Example 1. In this Example 6 the thirty (30) parts of chromic sulfate can be replaced by five (5) parts of ferric chlorid, or by twelve (12) parts of copper sulfate, or by ten (10) parts of ferric sulfate, or by nine (9) parts of copper chlorid, or by a mixture of twelve (12) parts of copper sulfate and half (.5) a part of vanadium tetrachlorid, or by a mixture of five (5) parts of ferric sulfate and five (5) parts of copper sulfate.

Now what I claim is:

1. The process of producing coloring matter of the anthracene series by heating alpha-amidoanthraquinone with a hereinbefore defined condensing agent.

2. The process of producing coloring matter of the anthracene series by heating alpha-amidoanthraquinone with sulfuric acid.

3. The process of producing coloring matter of the anthracene series by heating alpha-amidoanthraquinone with sulfuric acid in the presence of an oxidizing agent.

4. The process of producing coloring matter of the anthracene series by heating alpha-amidoanthraquinone with sulfuric acid in the presence of chromic acid.

In testimony whereof I have hereunto set my hand in the presence of two subscribing witnesses.

MAX ISLER.

Witnesses:
J. ALEC. LLOYD,
H. W. HARRIS.